US012568456B2

(12) United States Patent
Cozzo et al.

(10) Patent No.: US 12,568,456 B2
(45) Date of Patent: Mar. 3, 2026

(54) UPLINK TRANSMISSION TIMING IN NON-TERRESTRIAL NETWORKS

(71) Applicant: Samsung Electronics Co., Ltd., Suwon-si (KR)

(72) Inventors: Carmela Cozzo, San Diego, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 437 days.

(21) Appl. No.: 17/575,527

(22) Filed: Jan. 13, 2022

(65) Prior Publication Data

US 2022/0232504 A1     Jul. 21, 2022

Related U.S. Application Data

(60) Provisional application No. 63/237,404, filed on Aug. 26, 2021, provisional application No. 63/230,541, (Continued)

(51) Int. Cl.
*H04W 56/00*          (2009.01)
*H04W 72/1268*       (2023.01)
(Continued)

(52) U.S. Cl.
CPC ..... *H04W 56/0045* (2013.01); *H04W 56/001* (2013.01); *H04W 72/1268* (2013.01); (Continued)

(58) Field of Classification Search
CPC ........... H04W 56/0045; H04W 56/001; H04W 72/1268; H04W 72/23; H04W 74/0833; (Continued)

(56) References Cited

U.S. PATENT DOCUMENTS

2019/0254013 A1*   8/2019   Chang ....................... H04L 5/00
2020/0413451 A1   12/2020   Taherzadeh Boroujeni et al.
(Continued)

FOREIGN PATENT DOCUMENTS

KR     10-2020-0040193 A     4/2020
KR     10-2020-0130262 A     11/2020
(Continued)

OTHER PUBLICATIONS

International Search Report and Written Opinion issued Apr. 27, 2022 regarding Application No. PCT/KR2022/000958, 6 pages.
(Continued)

*Primary Examiner* — Steven Hieu D Nguyen

(57) ABSTRACT

Apparatuses and methods for uplink transmission timing in non-terrestrial networks (NTNs). A method for operating a user equipment includes receiving: first information, by a system information block, indicating a value of a first time offset; second information, by a medium access control (MAC) control element (CE), indicating a value of a second time offset; and a first channel in a first time unit associated with a transmission of a second channel in a second time unit. The method includes determining: a value of a third time offset based on a sum of the first and second time offsets and the second time unit based on the first time unit and the value of the third time offset and transmitting the second channel in the second time unit.

15 Claims, 12 Drawing Sheets

Related U.S. Application Data filed on Aug. 6, 2021, provisional application No. 63/139,131, filed on Jan. 19, 2021.

(51) Int. Cl.

| | |
|---|---|
| *H04W 72/23* | (2023.01) |
| *H04W 74/0833* | (2024.01) |
| *H04W 80/02* | (2009.01) |

(52) U.S. Cl.

CPC ........ *H04W 72/23* (2023.01); *H04W 74/0833* (2013.01); *H04W 80/02* (2013.01)

(58) Field of Classification Search

CPC . H04W 80/02; H04W 48/10; H04W 72/0446; H04W 72/231; H04W 72/232; H04W 74/002; H04W 84/06

See application file for complete search history.

(56) References Cited

U.S. PATENT DOCUMENTS

| | | | | |
|---|---|---|---|---|
| 2021/0105761 | A1* | 4/2021 | Cheng | H04B 7/2125 |
| 2021/0314892 | A1* | 10/2021 | Rico Alvarino | H04W 72/23 |
| 2022/0007455 | A1 | 1/2022 | Hong | |
| 2022/0015120 | A1* | 1/2022 | Qiu | H04W 72/1268 |
| 2022/0124660 | A1* | 4/2022 | Cheng | H04W 80/02 |
| 2022/0232503 | A1* | 7/2022 | Cheng | H04W 56/0045 |
| 2022/0287048 | A1* | 9/2022 | Lin | H04L 27/2655 |

FOREIGN PATENT DOCUMENTS

| | | |
|---|---|---|
| WO | 2020231831 A1 | 11/2020 |
| WO | 2020257387 A1 | 12/2020 |

OTHER PUBLICATIONS

Moderator (Ericsson), "Feature lead summary#4 on timing relationship enhancements", 3GPP TSG-RAN WG1 Meeting #102-e, R1-2007323, Aug. 2020, 58 pages.

Moderator (Thales), "FL Summary on enhancements on UL time and frequency synchronization for NR", P3GPP TSG-RAN WG1 Meeting #103-e, R1-2009697, Oct. 2020, 91 pages.

"3rd Generation Partnership Project; Technical Specification Group Radio Access Network; NR; Physical channels and modulation (Release 16)", 3GPP TS 38.211 V16.0.0, Dec. 2019, 129 pages.

"3rd Generation Partnership Project; Technical Specification Group Radio Access Network; NR; Multiplexing and channel coding (Release 16)", 3GPP TS 38.212 V16.0.0, Dec. 2019, 145 pages.

"3rd Generation Partnership Project; Technical Specification Group Radio Access Network; NR; Physical layer procedures for control (Release 16)", 3GPP TS 38.213 V16.0.0, Dec. 2019, 146 pages.

"3rd Generation Partnership Project; Technical Specification Group Radio Access Network; NR; Physical layer procedures for data (Release 16)", 3GPP TS 38.214 V16.0.0, Dec. 2019, 147 pages.

"5G; NR; Medium Access Control (MAC) protocol specification (3GPP TS 38.321 version 15.8.0 Release 15)", ETSI TS 138 321 V15.8.0, Jan. 2020, 80 pages.

"5G; NR; Radio Resource Control (RRC); Protocol specification (3GPP TS 38.331 version 15.8.0 Release 15)", ETSI TS 138 331 V15.8.0, Jan. 2020, 527 pages.

Extended European Search Report issued May 17, 2024 regarding Application No. 22742813.3, 12 pages.

Qualcomm Incorporated, "Random Access procedure with timing reference at gateway vs satellite", 3GPP TSG-RAN WG2 Meeting #112e, R2-2009451, Nov. 2020, 6 pages.

Huawei et al., "Discussion on timing relationship enhancements for NTN", 3GPP TSG RAN WGI Meeting #102-e, R1-2005265, Aug. 2020, 6 pages.

* cited by examiner

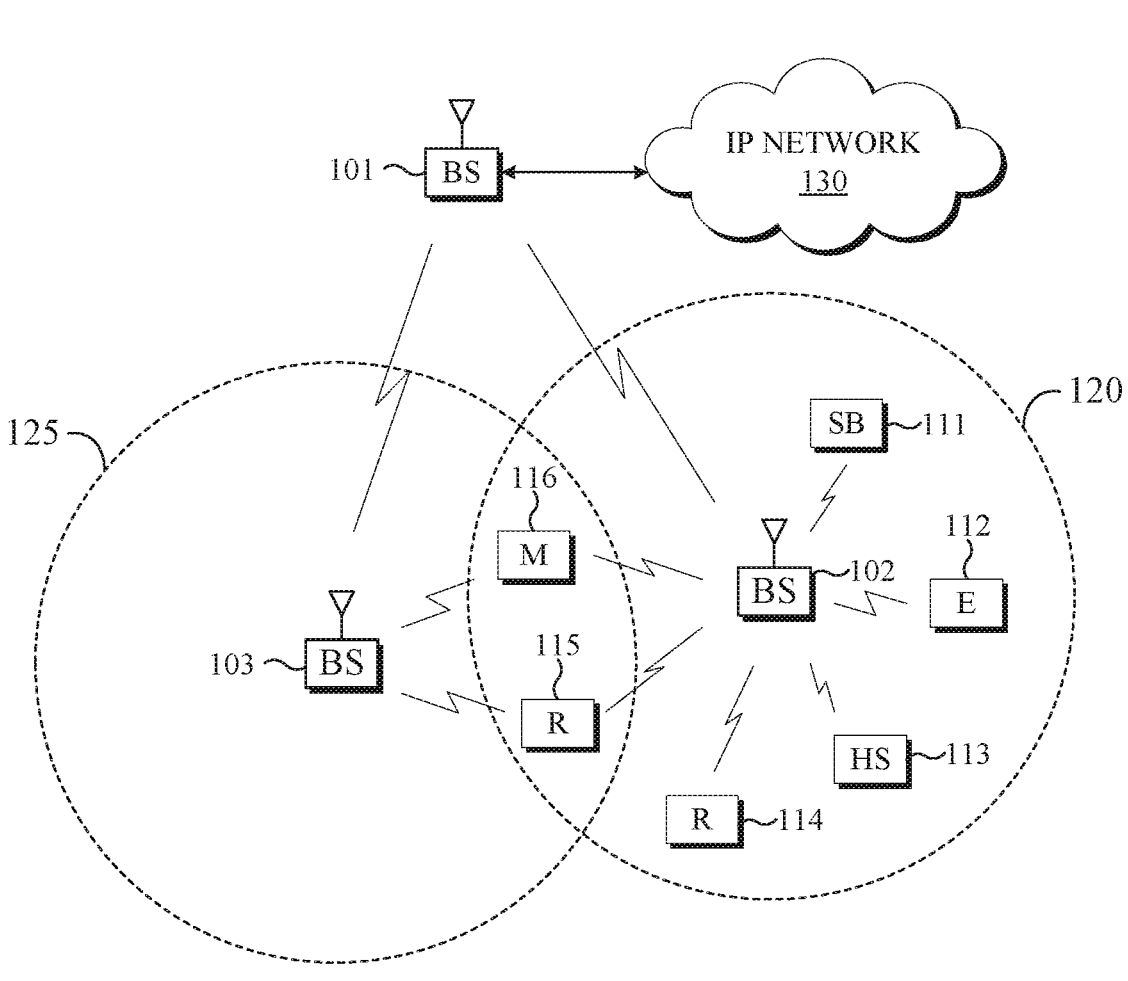
FIG. 1

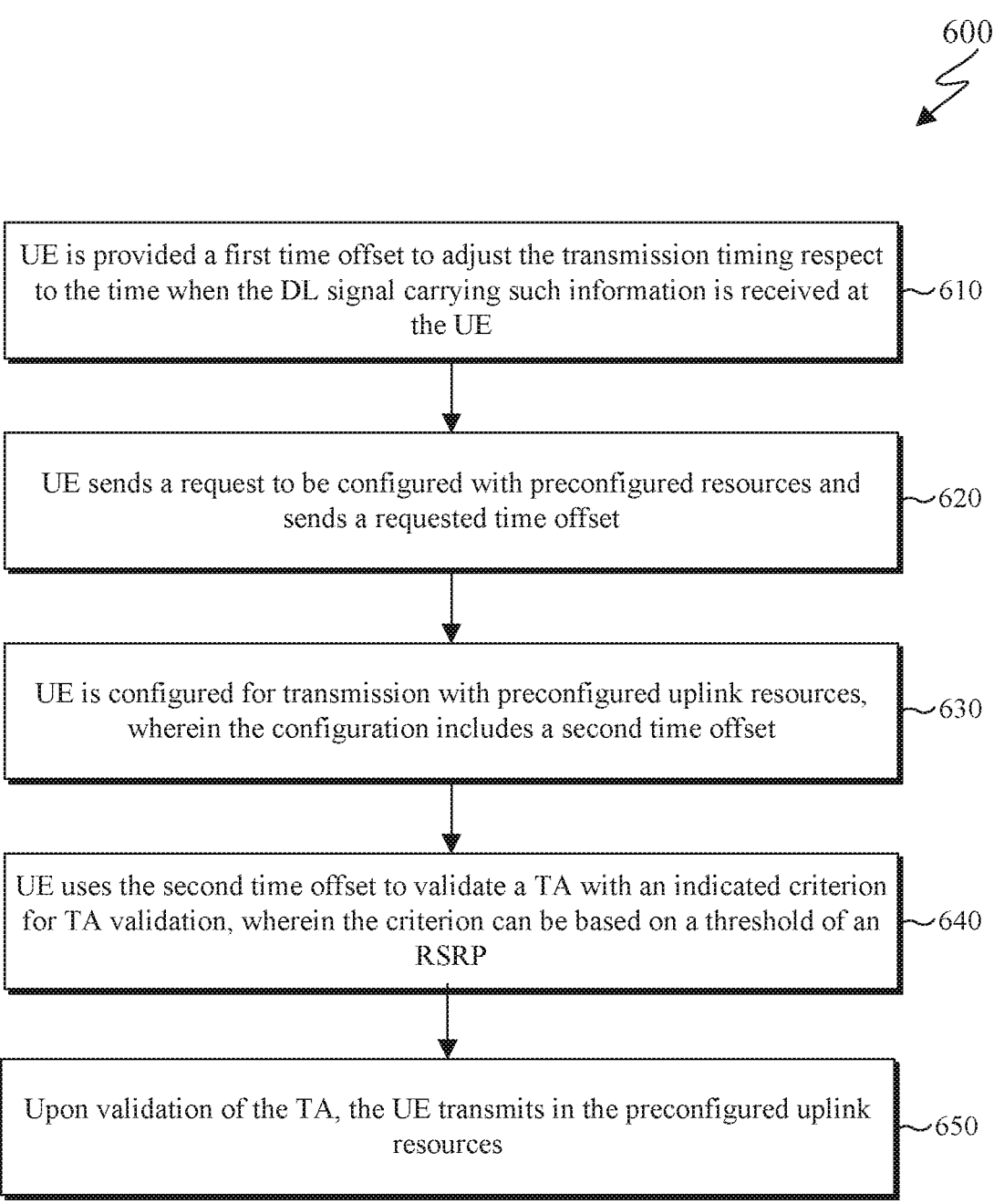

600

UE is provided a first time offset to adjust the transmission timing respect to the time when the DL signal carrying such information is received at the UE ~610

UE sends a request to be configured with preconfigured resources and sends a requested time offset ~620

UE is configured for transmission with preconfigured uplink resources, wherein the configuration includes a second time offset ~630

UE uses the second time offset to validate a TA with an indicated criterion for TA validation, wherein the criterion can be based on a threshold of an RSRP ~640

Upon validation of the TA, the UE transmits in the preconfigured uplink resources ~650

UE is provided preconfigured uplink resources by a gNB and transmits in a number of preconfigured resources occasions — 710

UE sends a request to be configured a time offset including a requested time offset — 720

UE receives a time offset and validates a TA before transmitting in a next preconfigured resource occasion — 730

800

UE has coverage from a first DL beam and determines the timing of an uplink transmission from a time offset acquired while served by the first beam ~810

UE changes serving beam to a second beam ~820

UE acquires a new time offset, wherein the new time offset can be configured in SIB or provided during or after the initial access procedure ~830

900

UE is configured a first value of a timing offset by a gNB in SIB          910

UE transmits Msg3 PUSCH with a transmission time derived from the first timing offset          920

UE transmits uplink channels with transmission times derived from a second value of the timing offset provided by a DCI format or RRC signaling          930

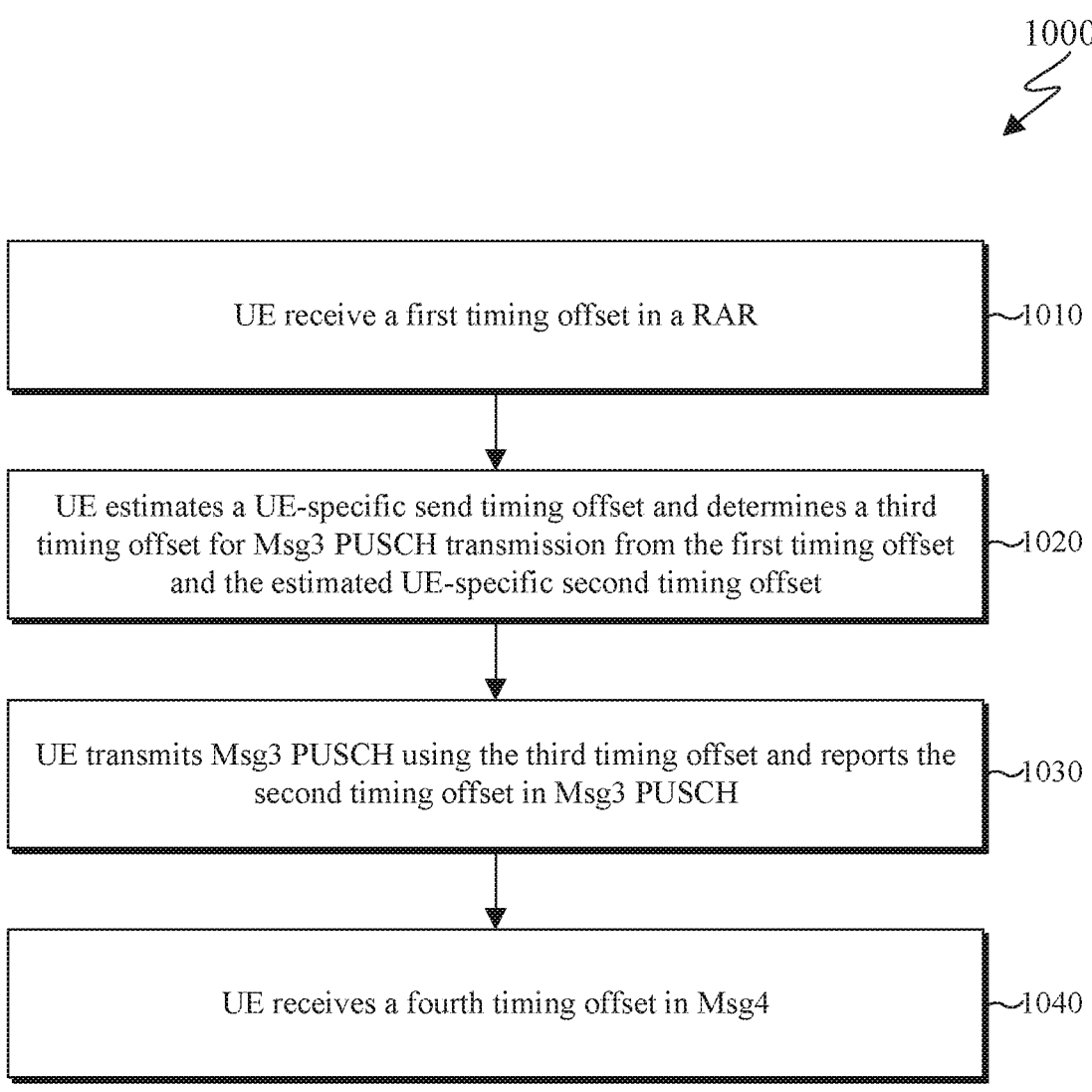

1000

UE receive a first timing offset in a RAR   ~1010

UE estimates a UE-specific send timing offset and determines a third timing offset for Msg3 PUSCH transmission from the first timing offset and the estimated UE-specific second timing offset   ~1020

UE transmits Msg3 PUSCH using the third timing offset and reports the second timing offset in Msg3 PUSCH   ~1030

UE receives a fourth timing offset in Msg4   ~1040

UE is configured to report a timing offset in Msg3 PUSCH          ~1210

UE receives a first timing offset in RAR          ~1220

UE reports an estimated timing offset in Msg3 PUSCH, wherein the Msg3 PUSCH is transmitted using the first timing offset          ~1230

UE receives a second timing offset, wherein the second timing offset is indicated by a MAC-CE signaling          ~1240

1300

UE is configured for PUR transmission by higher layers    ~1310

UE is provided by higher layer parameter *pur-SS-window-duration* a duration of a monitoring window    ~1320

UE transmits a NPUSCH transmission using preconfigured uplink resource ending in subframe $n$    ~1330

UE monitors the NPDCCH UE-specific search space in a search space window starting in subframe $n+m+k$    ~1340

UPLINK TRANSMISSION TIMING IN NON-TERRESTRIAL NETWORKS

CROSS-REFERENCE TO RELATED APPLICATION AND CLAIM OF PRIORITY

This application claims priority under 35 U.S.C. § 119(e) to U.S. Provisional Patent Application No. 63/139,131 filed on Jan. 19, 2021; U.S. Provisional Patent Application No. 63/230,541 filed on Aug. 6, 2021; and U.S. Provisional Patent Application No. 63/237,404 filed on Aug. 26, 2021. The above-identified provisional patent applications are hereby incorporated by reference in their entirety.

TECHNICAL FIELD

The present disclosure relates generally to wireless communication systems and, more specifically, the present disclosure relates to uplink transmission timing in non-terrestrial networks (NTNs).

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to uplink transmission timing in NTNs.

In one embodiment, a user equipment (UE) is provided. The UE includes a transceiver configured to receive: first information, by a system information block, indicating a value of a first time offset; second information, by a medium access control (MAC) control element (CE), indicating a value of a second time offset; and a first channel in a first time unit associated with a transmission of a second channel in a second time unit. The UE further includes a processor operably coupled to a transceiver. The processor is configured to determine a value of a third time offset based on a sum of the first and second time offsets and the second time unit based on the first time unit and the value of the third time offset. The transceiver is further configured to transmit the second channel in the second time unit.

In another embodiment, a base station (BS) is provided. The BS includes a transceiver configured to transmit: first information, by a system information block, indicating a value of a first time offset; second information, by a MAC CE, indicating a value of a second time offset; and a first channel in a first time unit associated with a reception of a second channel in a second time unit. The BS further includes a processor operably coupled to a transceiver. The processor is configured to determine: a value of a third time offset based on a sum of the first and second time offsets and the second time unit based on the first time unit and the value of the third time offset. The transceiver is further configured to receive the second channel in the second time unit.

In yet another embodiment, a method is provided. The method includes receiving: first information, by a system information block, indicating a value of a first time offset; second information, by a MAC CE, indicating a value of a second time offset; and a first channel in a first time unit associated with a transmission of a second channel in a second time unit. The method includes determining: a value of a third time offset based on a sum of the first and second time offsets and the second time unit based on the first time unit and the value of the third time offset and transmitting the second channel in the second time unit.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1 illustrates an example wireless network according to embodiments of the present disclosure;

FIG. 6 illustrates a method for a UE to determine a timing offset transmission of preconfigured uplink resources according to embodiments of present disclosure;

FIG. 10 illustrates a method for a UE to determine a transmission timing from a cell-specific timing offset indicated by a gNB and an estimated UE-specific timing offset according to embodiments of present disclosure;

DETAILED DESCRIPTION

Figure 2:
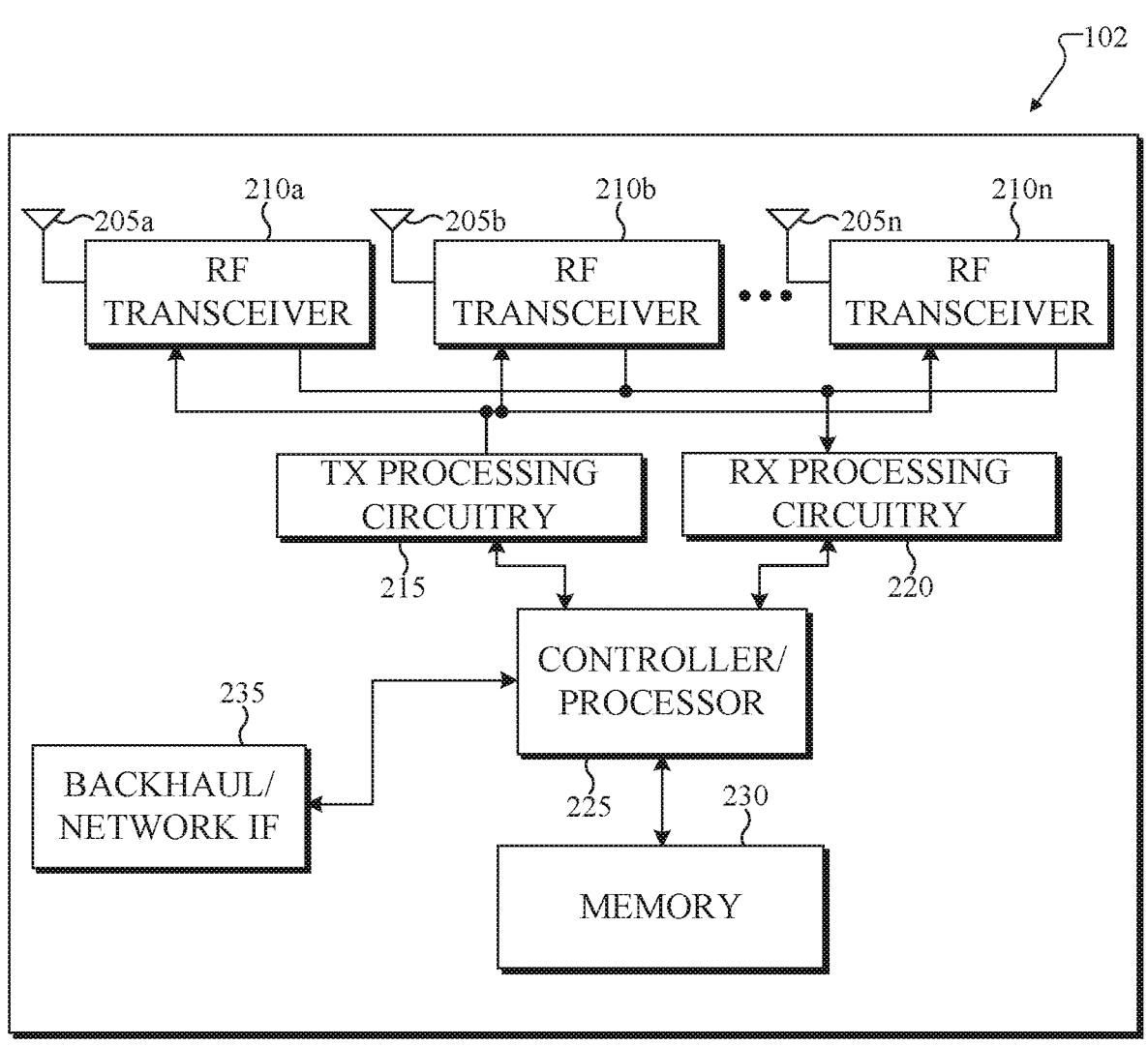
FIG. 2 illustrates an example base station (BS) according to embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: [1] 3GPP TS 38.211 v16.0.0, "NR; Physical channels and modulation," [2] 3GPP TS 38.212 v16.0.0, "NR; Multiplexing and channel coding,", [3] 3GPP TS 38.213 v16.0.0, "NR; Physical layer procedures for control," [4] 3GPP TS 38.214 v16.0.0, "NR; Physical layer procedures for data," [5] 3GPP TS 38.321 v15.8.0, "NR; Medium Access Control (MAC) Protocol Specification" and [6] 3GPP TS 38.331 v15.8.0, "NR; Radio Resource Control (RRC) Protocol Specification."

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, and the like. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 3:
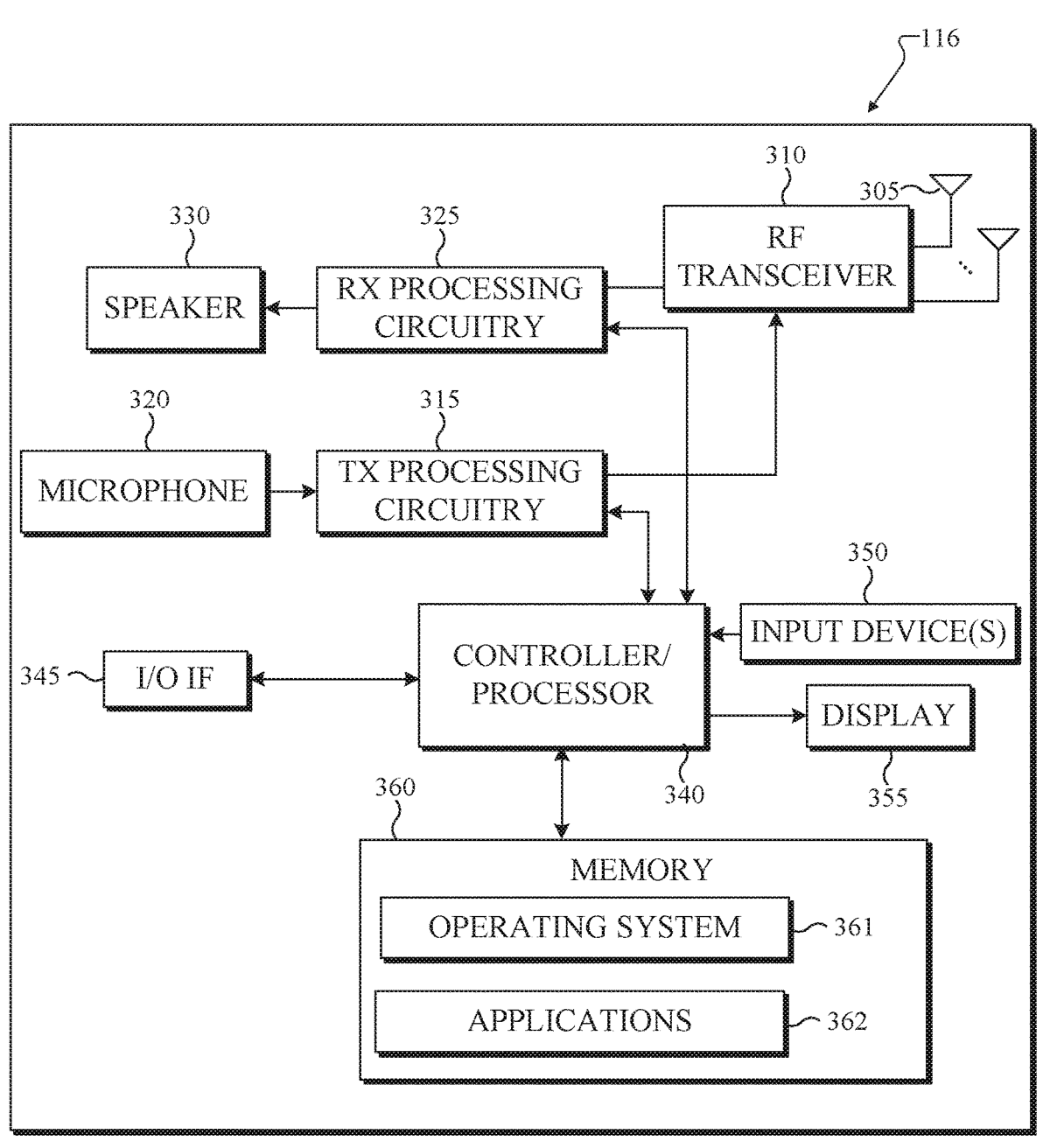
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for uplink transmission timing in NTNs. In certain embodiments, and one or more of the BSs 101-103 includes circuitry, programing, or a combination thereof for uplink transmission timing in NTNs. For example, any of BSs 101-103 may be a satellite in a NTN that provides wireless access to others of the BSs 102-103 and/or the UEs 111-116. Further, any of the UEs may receive wireless access via direct or indirect communication with satellites in an NTN. For example, network 100 may be an NTN.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support uplink transmission timing in NTNs. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports uplink transmission timing in NTNs. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figures 4, 5:
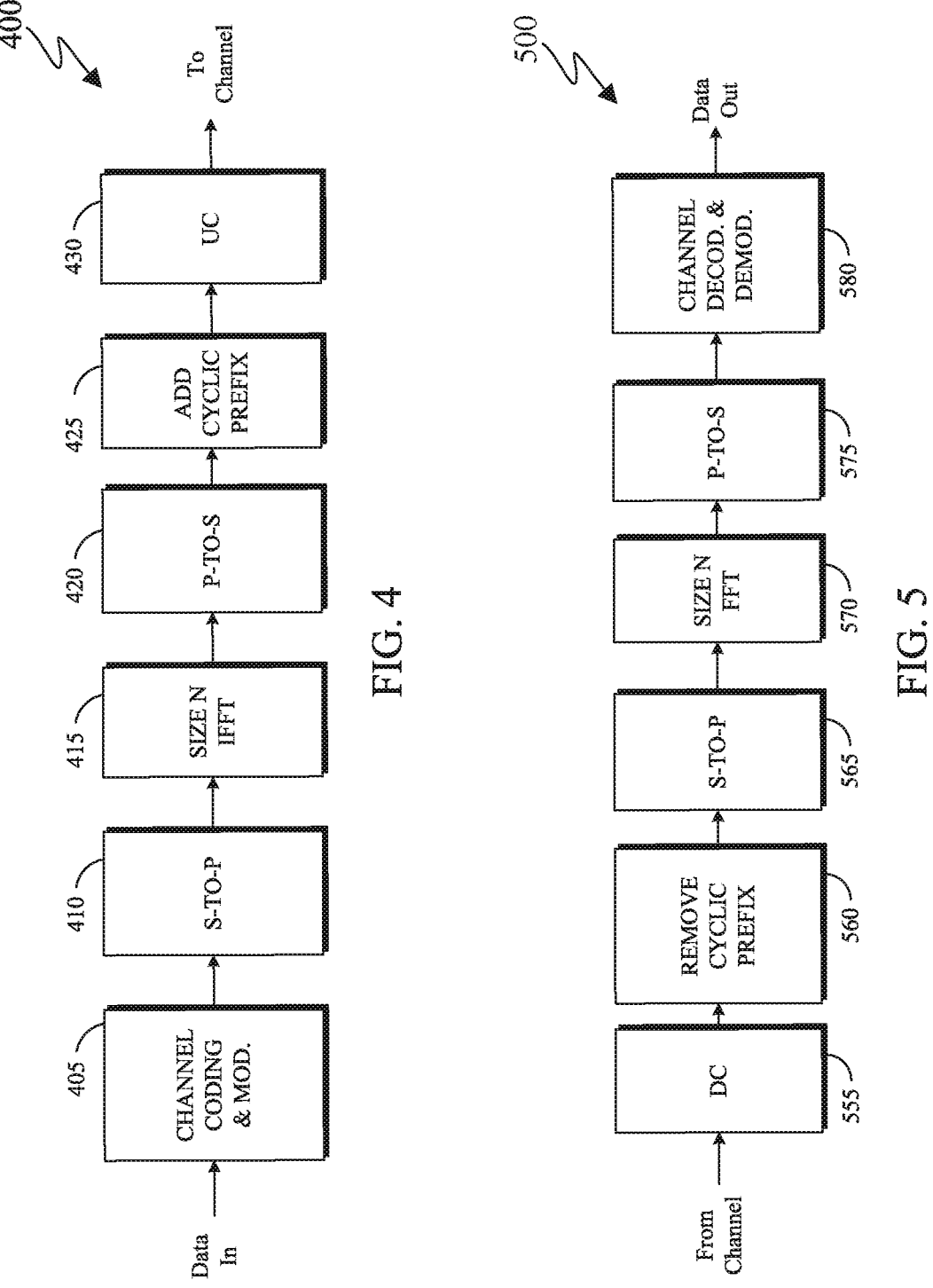
FIGS. 4 and 5 illustrate example wireless transmit and receive paths according to embodiments of present disclosure.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support uplink transmission timing in NTNs as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the down-link from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of trans-forms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wire-less transmit and receive paths, various changes may be made to FIG. 4 and FIG. 5. For example, various compo-nents in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Embodiments of the present disclosure relate to a deter-mination of the timing offset for transmission of uplink channels in a NTN. The present disclosure also relates to requesting a timing offset by a UE for timing advance (TA) validation for transmission in preconfigured uplink resources. The present disclosure further relates to a trans-mission with preconfigured uplink resources and the trans-mission of uplink resources scheduled by a downlink control information (DCI) format in multi-beam NTNs. Addition-ally, the present disclosure relates a determination of the timing offset for transmission of an uplink data channel and physical random access channel (PRACH) preamble trans-mission initiated by a physical downlink control channel (PDCCH) order in NTNs. Embodiments of the present disclosure also relate to a reporting of a timing offset during initial access. Embodiments of the present disclosure further relate to determining a timing offset by a higher layer configuration and a medium access control coverage enhancement (MAC-CE) indication in connected mode.

The terms gNB or BS as used throughout this disclosure describe a base station which can be part of an LTE-based or NR-based network. Embodiments described in this disclo-sure for either NB-internet of things (IoT) or LTE enhanced machine type communication (eMTC) operating in an NTN apply to both of these LTE-based technologies and also to an NR-based NTN.

An NTN is a network using RF resources on board a satellite or an unmanned aerial service (UAS) platform, and includes satellite which can be a Geostationary Earth Orbit-ing (GEO) satellite served by one or several sat-gateways which are deployed across the satellite targeted coverage or a non-GEO satellite served successively by one or several satellite-gateways at a time, a radio link between a sat-gateway and the satellite or UAS platform, a radio link between the UE and the satellite or UAS platform. A satellite or UAS platform may implement either a transparent or a regenerative (with on board processing) payload. The sat-ellite or UAS platform typically generates several beams over a given service area bounded by its field of view which depends on the on board antenna diagram and elevation angle. The footprint of a beam has an elliptic shape and is considered as a cell in terrestrial networks.

The propagation delays in NTN are much longer than the propagation delays in terrestrial mobile systems which are usually less than 1 ms, ranging from several milliseconds to hundreds of milliseconds depending on the altitudes of the spaceborne or airborne platforms and payload type in NTN. The cell size in NTN is much larger and UE in different parts of the cell experience different delays. Thus, the long propagation delays and large cell size require modifications of the timing aspects defined in terrestrial networks both at the physical layer and higher layers, including the TA mechanism.

A TA is an offset applied by the UE to an uplink transmission to ensure that the downlink and uplink frames are synchronized at the base station. A gNB can measure the timing of uplink signal from each UE and adjust the uplink transmission timing by sending the value of TA to the respective UE. When a UE sends a transmission, e.g. PRACH, physical uplink shared channel (PUSCH), physical uplink control channel (PUCCH), sounding reference signal (SRS), the gNB can estimate the uplink signal arrival time which can then be used to calculate the required TA value. The gNB can estimate the initial TA from PRACH sent by the UE and send a TA signaling in Random Access Response (RAR). Once the UE is in connected mode, the gNB estimates the TA value and, if a correction is needed, sends it to the UE by MAC Control Element. A gNB can also send a same TA value to all UEs in a cell. The TA value can be the maximum value among the values needed to adjust the TA of each UE in a cell.

Rel-16 NB-IoT and LTE-MTC support transmission in preconfigured uplink resources where a UE can transmit resources that were preassigned before connection setup. The main motivation for transmitting in preconfigured resources is to reduce the overhead of the signaling Msg1 through Msg4 at connection set up assuming the UE has obtained a valid TA. A UE (such as the UE 116) is configured with preconfigured uplink resources via dedicated RRC signaling while in connected state and obtains time-frequency resources, a preconfigured uplink resource (PUR) cell radio network temporary identifier (C-RNTI), power control parameters, and other parameters. The TA validation can be based on a timer which is part of the resource configuration or on a difference in reference signal received power (RSRP) values from the time that the configuration was done compared to a configured threshold. When a preconfigured uplink resources transmission is successfully received by the eNB, the acknowledgment can be provided in a DCI or in in an RRC message. After a time offset from when the transmission ends, the UE monitors a DCI format scrambled by the PUR C-RNTI that includes an acknowledgment or a retransmission request in a search space window of configurable length.

For early data transmission (EDT), Msg1 and Msg2 are used for TA validation and then data transmission starts in Msg3 that contains an RRC message. Msg4 acknowledges the UL data transmission and moves the UE to connected state. A Li in idle mode can transmit data in Msg3 of the random access procedure, and after successful reception by eNB, the random access procedure terminates and the UE does not transition to connected mode unless the MME or the eNB decides to move the UE to connected mode. The UE can request a grant for Early data Transmission (EDT) if the amount of pending data is smaller than a maximum size configured by eNB, by using a pre-configured set of narrowband physical random access channel (NPRACH) resources for preamble transmission. The eNB can allow the UE to transmit an amount of data smaller than the maximum configured size, and as needed, the eNB can order fallback to legacy random-access procedure during the EDT procedure.

For transmission in preconfigured resources for TA validation a UE can use a timing offset that was received for example in system information block (SIB). The timing offset in SIB can be a cell specific offset that the gNB configures for all UEs in a same cell. In large NTN cells configuring a single timing offset for all UEs can be not accurate because of the large variation of the transmission delays among the UEs. Thus there is a need to determine a more accurate timing offset to apply for TA validation for transmission in preconfigured uplink resources. The need of an accurate time offset in large NTN cells also exist for transmission of channels other than the data channel and for transmission modes other than preconfigured resources, for example for scheduled data transmission in connected mode or for transmission of uplink messages during initial access.

Throughout the disclosure, embodiments for requesting a timing offset or determining a timing offset by a UE for TA validation for uplink transmission in NTN are described for transmission in preconfigured uplink resources and equally apply to transmission in non-preconfigured resources wherein an uplink transmission is scheduled by a DCI format.

Additionally, throughout the disclosure, the terms Timing Advance, timing offset, and timing adjustment are interchangeably used.

Moreover, throughout the disclosure, embodiments are described for NB-IoT and equally apply to LTE-MTC and NR. Timing offsets described for uplink transmissions of NB-IoT channels such NPRACH or narrowband physical uplink shard channel (NPUSCH) and related to the reception of downlink channels such as narrowband physical downlink control channel (NPDCCH) or narrowband physical downlink shared channel (NPDSCH), equally apply to MPRACH, MPUSCH, MPDCH, MPDSCH for LTE-MTC and to PRACH, PUSCH, PDCCH and PDSCH in NR.

Furthermore, the terms BS, eNB, and gNB are interchangeably used throughout the disclosure.

For transmission in preconfigured uplink resources, a validation of the timing offset is done by the UE before starting transmission in the preconfigured resources. A UE (such as the UE 116) sends a PURConfigurationRequest message to indicate to the gNB that the UE is interested to be configured with preconfigured uplink resources and to provide preconfigured uplink resources related information to gNB, including the requested time gap from the transmission of the request of preconfigured uplink resources until the first transmission occasion. A gNB indicates the time gap with respect to current time until the first transmission occasion in the configuration. When a UE is configured with preconfigured resources, the UE can be already in possess of a timing offset, for example the timing offset received in SIB and common to all users in the cell. For validation of the TA before transmitting in the preconfigured resources, the UE can use the timing offset received in SIB and/or received in the preconfigured resources configuration, wherein the timing offset is always present in the preconfigured uplink resources configuration in NTN. A gNB can also indicate in SIB whether the timing offset in SIB can be used for TA validation prior to transmission in preconfigured resources. A gNB can configure a criterion for TA validation in SIB and indicate whether the timing offset provided in SIB can be used for TA validation with a configured TA validation criterion.

Figure 7:
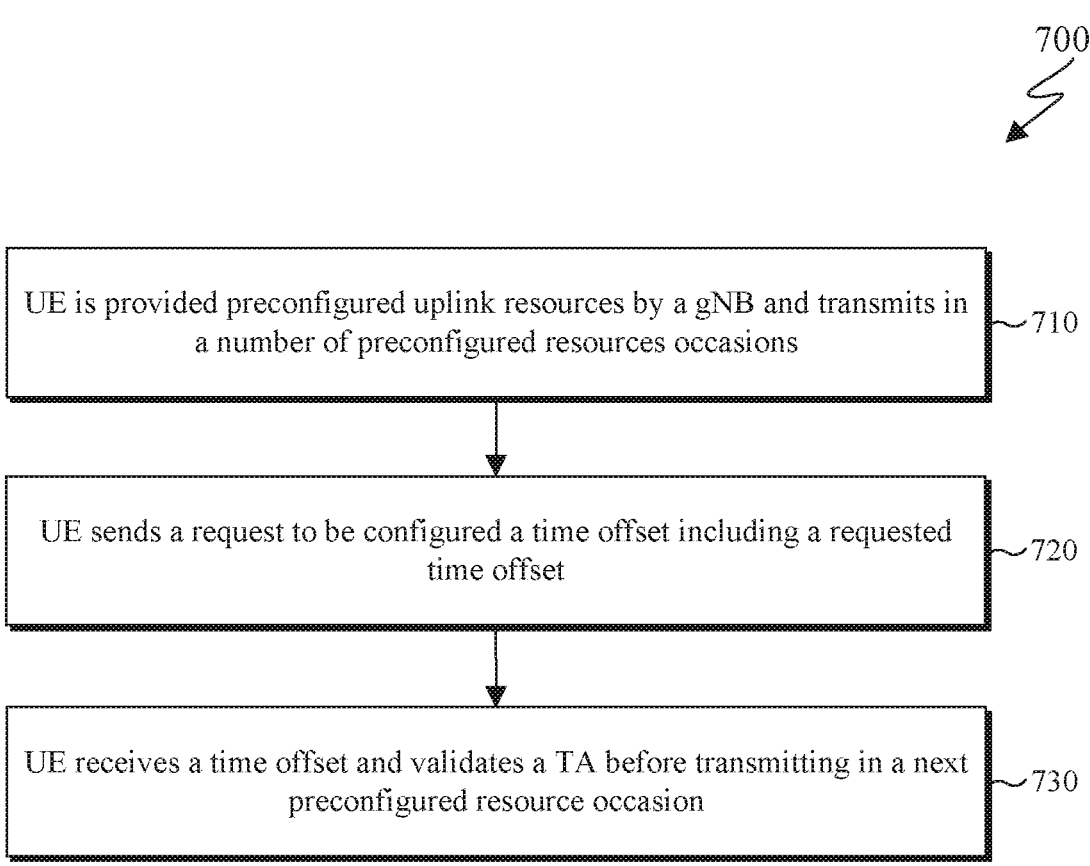
FIG. 7 illustrates a method for a UE to request a timing offset to adapt the transmission of preconfigured recourses that were previously configured to the UE according to embodiments of present disclosure.
Figure 8:
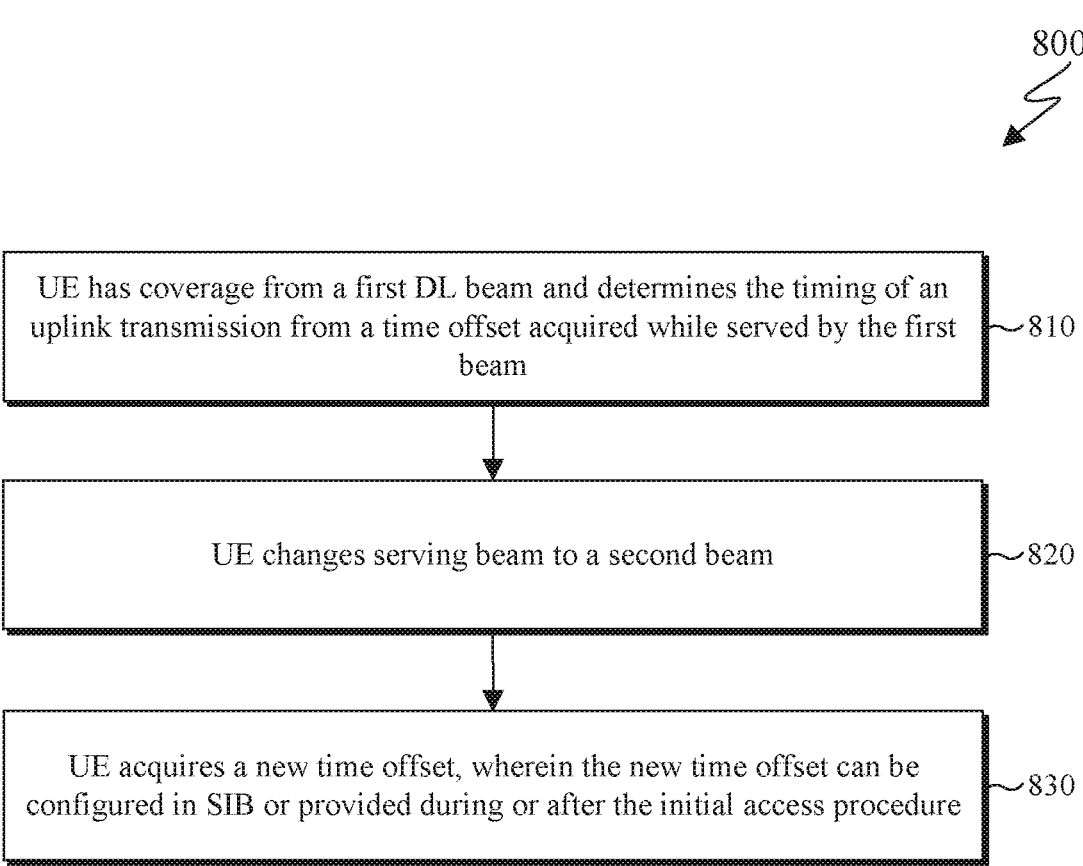
FIG. 8 illustrates a method for a UE to update a timing offset applied to uplink transmission after coverage is obtained from a different beam of the same or different satellite or unmanned aircraft system (UAS) platform according to embodiments of present disclosure.

FIG. 6 illustrates a method 600 for a UE to determine a timing offset transmission of preconfigured uplink resources according to embodiments of present disclosure. In particular, the method 600 describes a UE (such as the UE 116) determining a timing offset transmission of preconfigured uplink resources by requesting a timing offset and receiving it in the configuration of the preconfigured resources. FIG. 7 illustrates a method 700 for a UE to request a timing offset to adapt the transmission of preconfigured recourses that were previously configured to the UE according to embodiments of present disclosure. FIG. 8 illustrates a method 800 for a UE to update a timing offset applied to uplink transmission after coverage is obtained from a different beam of the same or different satellite or unmanned aircraft system (UAS) platform according to embodiments of present disclosure.

The steps of the methods 600, 7000, and 800 can be performed by any of the UEs 111-116 of FIG. 1, such as the UE 116 of FIG. 3, as well as any of the BSs 101-103 of FIG. 1, such as the BS 102 of FIG. 2. The method 600 of FIG. 6, method 700 of FIG. 7, and method 800 of FIG. 8 are for illustration only and other embodiments can be used without departing from the scope of the present disclosure.

As illustrated in FIG. 6, the method 600 describes a UE determining a timing offset for transmission of preconfigured uplink resources by requesting a timing offset and receiving it in the configuration of the preconfigured resources.

In step 610, a UE (such as the UE 116) is provided a first time offset to adjust the transmission timing respect to the time when the DL signal carrying such information is received at the UE in step 620, the UE sends a request to be configured with preconfigured resources and sends a requested time offset. In step 630, the UE is configured for transmission with preconfigured uplink resources, wherein the configuration includes a second time offset. In step 640, the UE uses the second time offset to validate a TA with an indicated criterion for TA validation, wherein the criterion can be based on a threshold of an RSRP. Upon validation of the TA, the UE in step 650, transmits in the preconfigured uplink resources.

A UE (such as the UE 116) with Global Navigation Satellite System (GNSS) capability can estimate and pre-compensate a timing offset with sufficient accuracy for uplink (UL) transmission, and utilize the estimated timing offset in determining the transmission time of an uplink channel in preconfigured or scheduled uplink resources. A UE can also utilize such estimated timing offset as a requested timing offset sent in the resource configuration request in step 620 in FIG. 6, wherein the timing offset is received by a gNB that provides a second timing offset in step 630.

In certain embodiments, a UE (such as the UE 116) validates a TA and starts transmitting in the preconfigured uplink resources. The validity of the TA can be associated to a timer which was provided in the preconfigured resources configuration, wherein the timer can be given in number of subframes or slots after the first transmission in the configured preconfigured resources. If the timer expires while there are still resources assigned to the UE, and the UE desires to keep the resources, the TA needs to be validated again. The UE can send a request to the gNB to update the TA including a requested time offset from the transmission of such request until the next resource transmission occasion after the last resource that was utilized by a UE and received by a gNB. The gNB will configure a new timing offset. The request by the UE is done by RRC signaling and the UE send the request after sending a PRACH and receiving a RAR.

As illustrated in FIG. 7, the method 700 describes a UE requesting a timing offset to adapt the transmission of preconfigured resources that were already configured to the UE.

In step 710, a UE (such as the UE 116) is provided preconfigured uplink resources configuration by a gNB and transmits in a number of preconfigured resources occasions. In step 720, the UE send a request to be configured a time offset including a requested time offset. In step 730, the UE receives a time offset and validates a TA before transmitting in a preconfigured resource occasion.

Alternatively, the TA validation prior to transmitting in the preconfigured resources can be done by transmitting a PRACH and receiving a timing offset information in the RAR. This can be done for TA validation before the initial transmission in the preconfigured resources and/or TA validation for transmission in any of the transmission occasions when the TA is considered invalid by the UE.

In Rel-16 NB-IoT and eMTC operation in terrestrial networks, a serving cell change enables a TA validation. The TA is considered invalid when the UE initiates the RA procedure in a different cell than where TA was last validated. In NTN, downlinks are being used to achieve efficient coverage and different beam footprints can be seen as different cells in terrestrial networks. The different beams can correspond to a single or multiple satellites or UAS platforms. Thus, a serving beam change in NTN enables a TA validation.

As illustrated in FIG. 8, the method 800 describes a UE updating a timing offset applied to uplink transmissions after coverage is obtained from a different beam of a same or different satellite or UAS platform.

In step 810, a UE (such as the UE 116) has coverage from a first DL beam and determines the timing of an uplink transmission from a time offset acquired while served by the first beam. In step 820, the UE changes serving beam to a second beam. In step 830, the UE acquires a new time offset, wherein the new time offset can be configured in SIB or provided during or after the initial access procedure.

Although FIGS. 6-8 illustrate the methods 600-800 various changes may be made to FIGS. 6-8. For example, while the methods 600-800 are shown as a series of steps, various steps could overlap, occur in parallel, occur in a different order, or occur multiple times. In another example, steps may be omitted or replaced by other steps. For example, steps of the method 600 can be executed in a different order.

Embodiments of the present disclosure describe refining the timing for transmission an uplink channel after initial access. The following examples and embodiments, such as those of FIGS. 9-12 describe this in greater detail.

Figure 9:
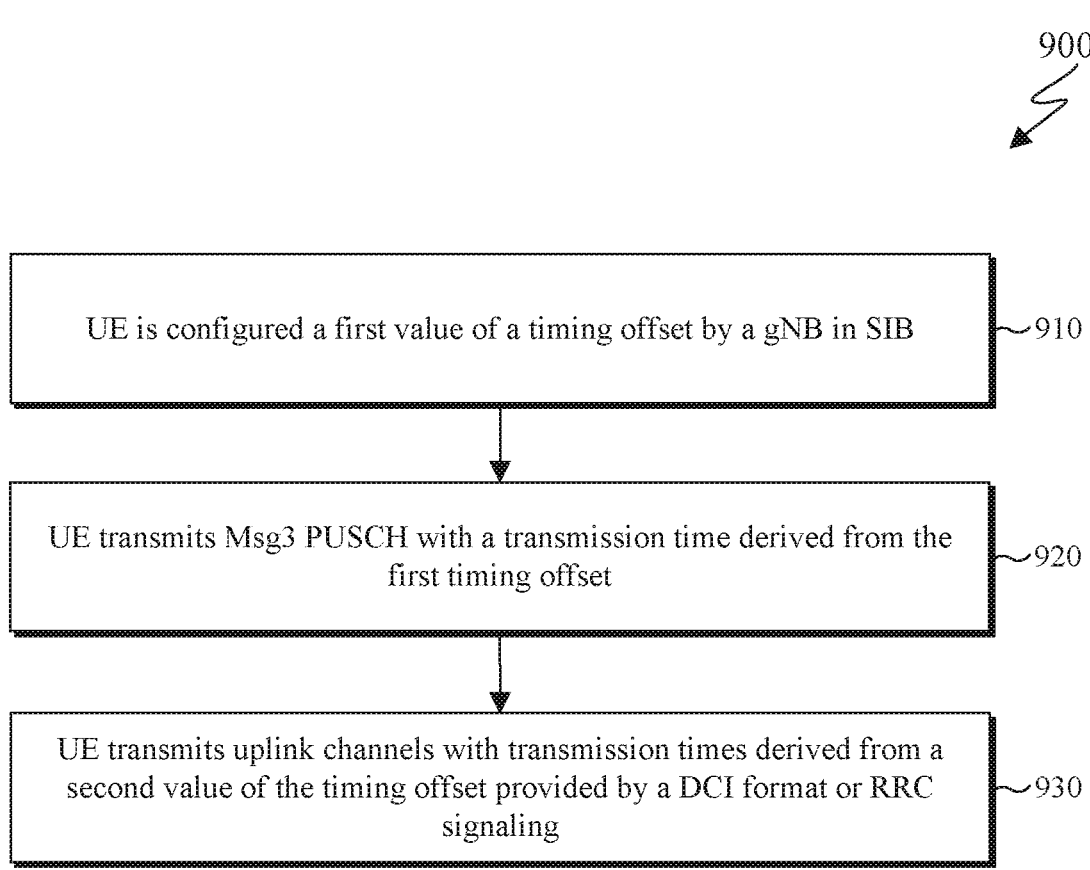
FIG. 9 illustrates a method for a UE to determine a transmission time during initial access and in connected mode according to embodiments of present disclosure.
Figure 11:
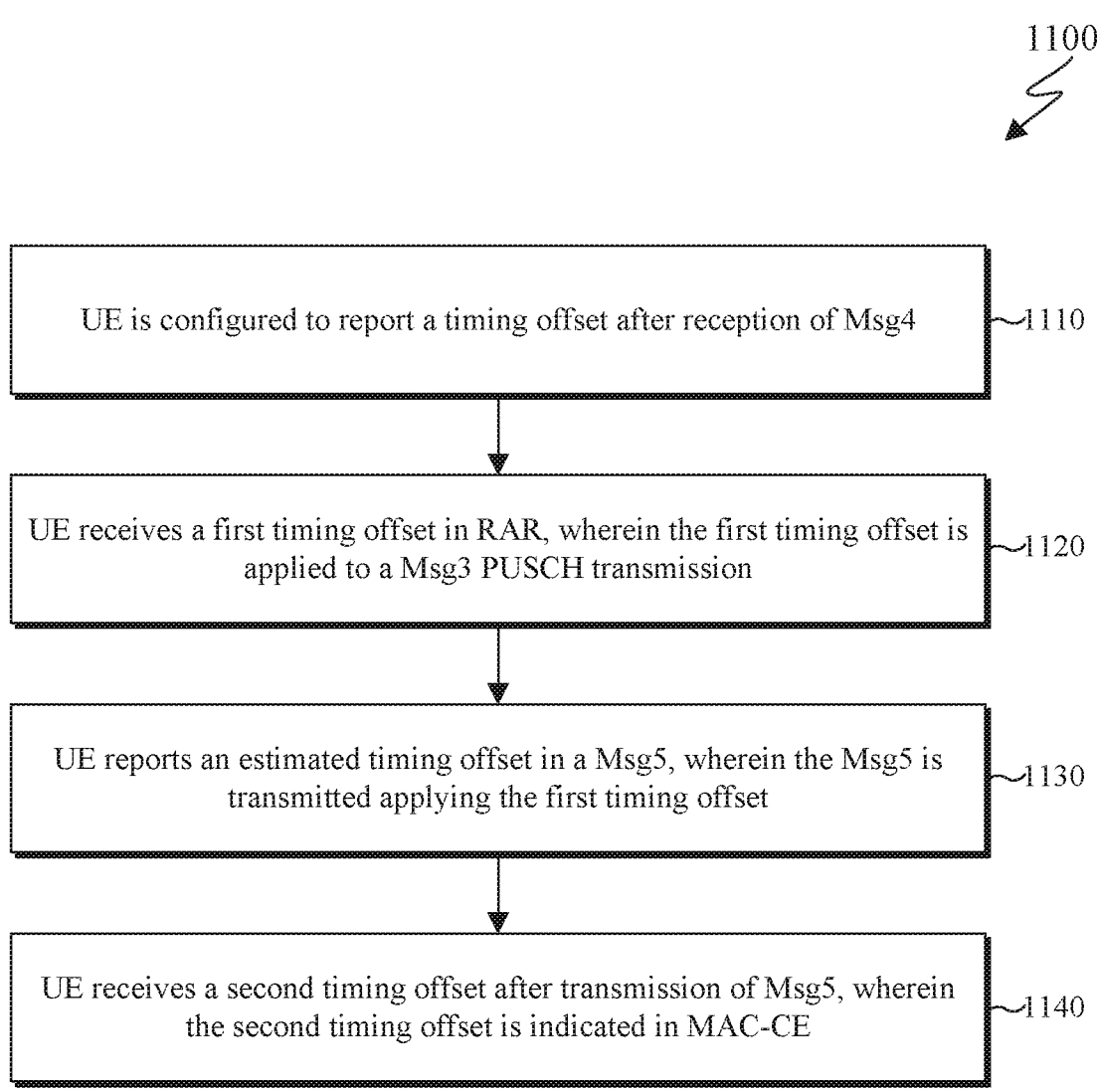
FIG. 11 illustrates a method for when a UE uses a first timing offset provided by a random access response (RAR) during initial access and uses a second timing offset during connected mode, where the second timing offset is based on a UE report and a gNB indication according to embodiments of present disclosure.
Figure 12:
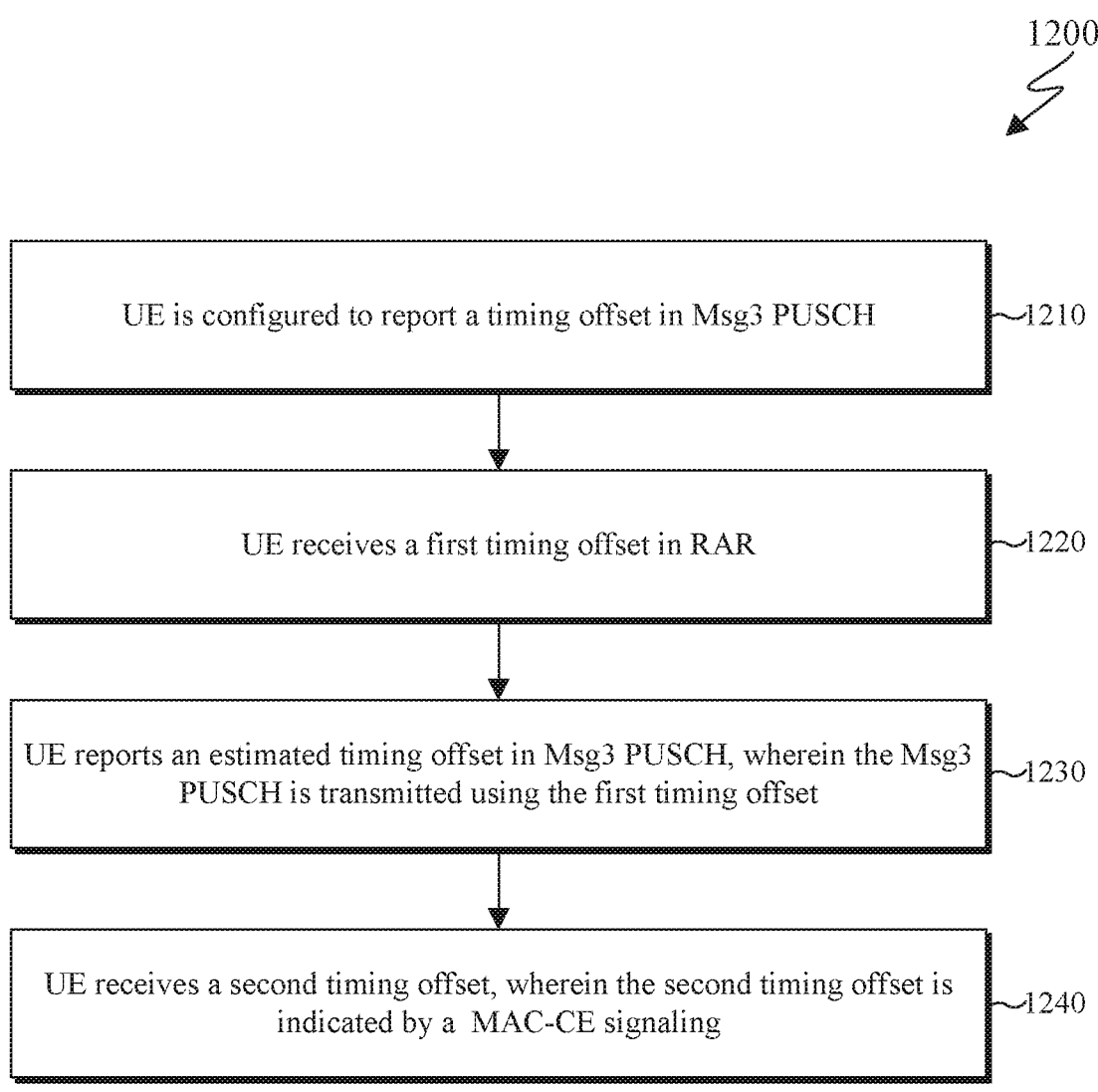
FIG. 12 illustrates a method for when a UE uses a first timing offset provided by a RAR during initial access and uses a second timing offset during connected mode, where the second timing offset is based on a UE reporting Msg3 and a gNB indication according to embodiments of present disclosure.

FIG. 9 illustrates a method 900 for a UE to determine a transmission time during initial access and in connected mode according to embodiments of present disclosure. FIG. 10 illustrates a method 1000 for a UE to determine a transmission timing from a cell-specific timing offset indicated by a gNB and an estimated UE-specific timing offset according to embodiments of present disclosure. FIG. 11 illustrates a method 1100 for when a UE uses a first timing offset provided by a RAR during initial access and uses a second timing offset during connected mode, where the second timing offset is based on a UE report and a gNB indication according to embodiments of present disclosure. FIG. 12 illustrates a method 1200 for when a UE uses a first timing offset provided by a RAR during initial access and uses a second timing offset during connected mode, where the second timing offset is based on a UE reporting Msg3 and a gNB indication according to embodiments of present disclosure.

The steps of the methods 900, 1000, 1100, and 1200 can be performed by any of the UEs 111-116 of FIG. 1, such as the UE 116 of FIG. 3, as well as any of the BSs 101-103 of FIG. 1, such as the BS 102 of FIG. 2. The method 900 of FIG. 9, method 1000 of FIG. 10, method 1100 of FIG. 11, and method 1200 of FIG. 12 are for illustration only and other embodiments can be used without departing from the scope of the present disclosure.

In certain embodiments, a timing offset applied by a UE (such as the UE 116) for an uplink transmission is refined for transmission after initial access. In NTN, the determination of the timing offset to use in the timing relationships of uplink channels can be done by using one or more values of the timing offset. For example, one value is provided in SIB for transmission during initial access, and refining the timing offset value is in connected mode, wherein the timing offset can be provided by a DCI format or RRC signaling or MAC-CE signaling.

As illustrated in FIG. 9, the method 900 describes an example of a UE determining a transmission time during initial access and in connected mode.

In step 910, a UE (such as the UE 116) is configured a first value of a timing offset by a gNB in SIB. In step 920, the UE transmits Msg3 PUSCH with a transmission time derived from the first timing offset. In step 930, the UE transmits uplink channels with transmission times derived from a second value of the timing offset provided by a DCI format or RRC signaling. Alternatively, in step 930 transmission times are derived from a combination of the first and second values of the timing offset. Alternatively, or additionally, in step 930 a timing offset can be provided by MAC-CE signaling.

In certain embodiments, a timing offset applied by a UE (such as the UE 116) for an uplink transmission is refined for transmission during or after initial access based on an estimated timing offset by the UE when the UE receives an indication that enables the report of the estimated timing offset. A UE can receive a timing offset in a RAR, wherein the timing offset is a cell-specific value, and transmit Msg3 PUSCH with a transmission time derived from the received timing offset in the RAR and from an estimated timing offset wherein the estimated timing offset is a UE-specific value. The UE transmits the estimated timing offset value in Msg3 PUSCH by MAC-CE signaling so that the gNB can estimate a UE-specific timing offset value that would be indicated in Msg4.

As illustrated in FIG. 10, the method 1000 describes a UE determining a transmission timing from a cell-specific timing offset indicated by a gNB and an estimated UE-specific timing offset.

In step 1010, a UE (such as the UE 116) receives a first timing offset in a RAR. In step 1020, the UE estimates a UE-specific second timing offset and determines a third timing offset for Msg3 PUSCH transmission from the first timing offset and the estimated UE-specific second timing offset. In step 1030, the UE transmits Msg3 PUSCH using the third timing offset and reports the second timing offset in Msg3 PUSCH. In step 1040, the UE receives a fourth timing offset in Msg4.

In certain embodiments, it is possible that in step 1030, the UE determines an offset timing for Msg3 transmission from the first timing offset and transmits Msg3 PUSCH with the determined first timing offset. The estimated UE-specific second timing offset is reported in Msg3 PUSCH but it is not used in the determination of the timing offset used for the Msg3 PUSCH transmission. This avoids a misunderstanding between the UE and the network about the timing offset used for the transmission of Msg3 PUSCH wherein the latter would depend only on the offset indicated by the network.

In certain embodiments, the UE reports an estimated timing offset after receiving Msg4, wherein the estimated timing offset is used by the gNB to calculate an offset signaled to the UE by a Timing Advance Command in MAC CE in an RRC configuration.

The timing offset used by the UE for Msg3 transmission or for an uplink transmission upon reception of Msg4 or for an uplink transmission during connected mode can be based on a combination of DCI signaling, Timing Advance Command in MAC CE and RRC configuration, or a combination of Timing Advance Command in MAC CE and RRC configuration, or during initial access of a combination of Timing Advance Command in RAR and RRC configuration.

The Timing Advance Command in RAR has 11 bits and can indicate an index value TA (0, 1, 2 . . . 1282). The index value TA is used to control the amount of timing adjustment that UE has to apply. The amount of the time alignment is given by NTA=TA×16. The Timing Advance obtained via RAR is always positive with a minimum adjustment when TA=1 and maximum adjustment when TA=1282. To cover the large distance in NTN, the field that indicates the offset in RAR needs to be extended above 11 bits, or the Timing Advance calculation is scaled differently and the timing adjustment in NTN will have a different granularity than the granularity of the timing adjustment in terrestrial networks.

The Timing Advance Command in MAC CE indicates relative Timing Advance which is 6-bit index value $T_A$ (0, 1, 2 . . . 63). In this case, $N_{TA,new}=N_{TA,old}+(T_A-31)\times16$ where $N_{TA,old}$ is the current timing adjustment and $N_{TA,new}$ indicates new value. To cover the large distance in NTN, the field that indicates the offset in MAC CE needs to be extended above 6 bits, or the Timing Advance calculation is scaled differently and the timing adjustment in NTN will have a different granularity than the granularity of the timing adjustment in terrestrial networks.

In certain embodiments a UE (such as UE 116) uses a cell-specific timing offset provided by a gNB (such as BS 102) during initial access and is configured to use a UE-specific timing offset in connected mode. A UE can be configured to report a timing offset during initial access, for example in Msg3, or in Msg5 or during connected mode wherein a gNB can trigger a UE report by a DCI format.

As illustrated in FIG. 11, the method 1100 describes an example when the UE uses a first timing offset provided by a RAR during initial access and uses a second timing offset during connected mode, wherein the second timing offset is based on a UE report and a gNB indication.

In step 1110, a UE (such as the UE 116) is configured to report a timing offset after reception of Msg4, in step 1120, the UE receives a first timing offset in RAR, wherein the first timing offset is applied to a Msg3 PUSCH transmission. In step 1130, the UE reports an estimated timing offset in a Msg5, wherein the Msg5 is transmitted applying the first timing offset. In step 1140, the UE receives a second timing offset after transmission of Msg5, wherein the second timing offset is indicated in MAC-CE. Alternatively, in step 1140, the second timing offset is configured by an RRC parameter or is indicated in a DCI format or a combination of the above.

As illustrated in FIG. 12, the method 1200 describes an example when the UE uses a first timing offset provided by a RAR during initial access and uses a second timing offset during connected mode, wherein the second timing offset is based on a UE report in Msg3 and a gNB indication.

In step 1210, a UE (such as the UE 116) is configured to report a timing offset in Msg3 PUSCH. In step 1220, the UE receives a first timing offset in RAR. In step 1230, the UE reports an estimated timing offset in Msg3 PUSCH, wherein the Msg3 PUSCH is transmitted using the first timing offset. In step 1240, the UE receives a second timing offset, wherein the second timing offset is indicated by MAC-CE signaling.

Although FIGS. 9-12 illustrate the methods 900-1200 various changes may be made to FIGS. 9-12. For example, while the methods 900-1200 are shown as a series of steps, various steps could overlap, occur in parallel, occur in a different order, or occur multiple times. In another example, steps may be omitted or replaced by other steps. For example, steps of the method 900 can be executed in a different order.

Embodiments of the present disclosure also describe determining timing for transmission of an uplink channel or the timing for monitoring of a downlink channel. The following examples and embodiments, such as those of FIG. 13 describe this in greater detail.

Figure 13:
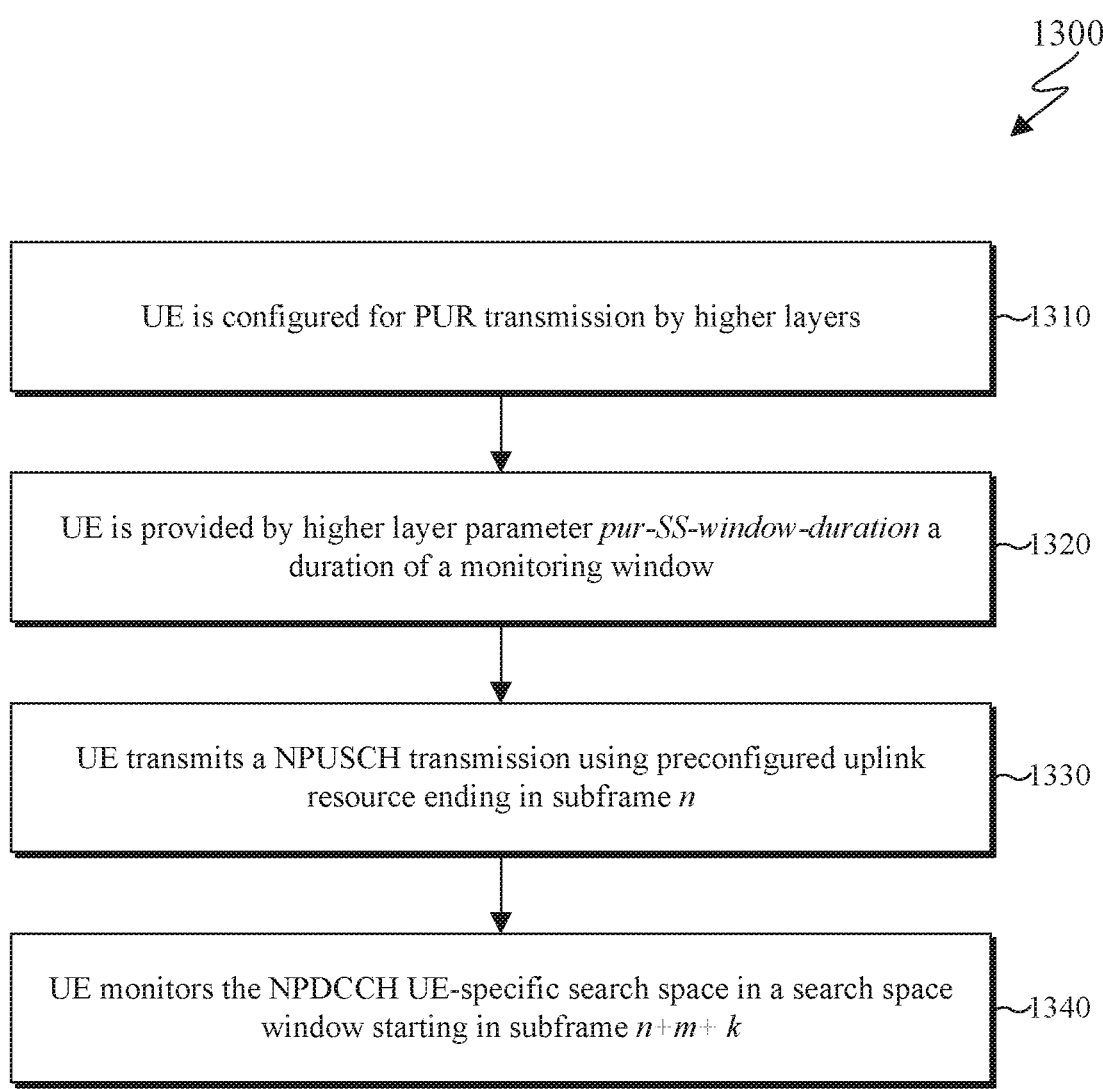
FIG. 13 illustrates a method for when a UE uses a first timing offset provided by a RAR during initial access and uses a second timing offset during connected mode, where the second timing offset is based on a UE report and a gNB indication according to embodiments of present disclosure.

FIG. 13 illustrates a method 1300 for when a UE uses a first timing offset provided by a RAR during initial access and uses a second timing offset during connected mode, where the second timing offset is based on a UE report and a gNB indication according to embodiments of present disclosure. The steps of the method 1300 can be performed by any of the UEs 111-116 of FIG. 1, such as the UE 116 of FIG. 3, as well as any of the BSs 101-103 of FIG. 1, such as the BS 102 of FIG. 2. The method 1300 of FIG. 13 is for illustration only and other embodiments can be used without departing from the scope of the present disclosure.

The propagation delays in NTN are much longer than the propagation delays in terrestrial mobile systems which are usually less than 1 ms, ranging from several milliseconds to hundreds of milliseconds depending on the altitudes of the airborne platforms. The cell size in NTN is much larger and UEs in different parts of the cell experience different delays. Thus, for NTN there is a need to take into account the long propagation delays and large cell size in the timing relationships between DL and UL channels in order to align DL and UL receptions at the eNB side. A timing offset k_offset needs to be considered in the timing relationships for transmission by the UE. The timing offset k_offset needs also to be considered in the timing relationships for monitoring DL channels by the UE.

In certain embodiments, a timing offset k_offset is derived from a timing information provided in SIB, or configured in a preconfigured resource configuration, or configured in a timing offset configuration, or provided by a Timing Advance Command in a RAR or by Timing Advance Command in MAC CE. The value of k_offset can be in subframe unit or slot unit.

When a UE (such as the UE 116) is configured for PUR transmission by higher layers, the UE decodes NPDCCH with CRC scrambled by the PUR-RNTI and the corresponding NPDSCH. If the UE has initiated a NPUSCH transmission using preconfigured uplink resource ending in subframe n, the UE shall monitor the NPDCCH UE-specific search space in a search space window starting in subframe n+x with duration given by higher layer parameter pur-SS-window-duration. The value of x can be x=m+k wherein the value of m can be a fixed value, for example m=4, or can be provided by higher layer. The value of the parameters n, m and k can be in subframe unit or slot unit. The value of the parameter m can be any integer number, including 0. It is also possible that the parameter m can have a negative value to indicate early ending of the NPUSCH transmission using preconfigured uplink resource and start of monitoring the NPDCCH UE-specific search space. The value of the parameter k can be equal to the value of a round trip time (RTT) between a UE and a gNB, wherein the RTT value is given by the sum of a TA value and an additional value $k_{MAC}$, if present, provided by higher layers. Then the UE shall monitor the NPDCCH UE-specific search space in a search space window starting in subframe $n+m+TA+k_{MAC}$ It is also possible that the value of the parameter k is equal to the value of $k_{MAC}$ provided by higher layers. Then the UE shall monitor the NPDCCH UE-specific search space in a search space window starting in subframe $n+m+k_{MAC}$.

As illustrated in FIG. 13, the method 1300 describes an example when the UE uses a first timing offset provided by a RAR during initial access and uses a second timing offset during connected mode, wherein the second timing offset is based on a UE report and a gNB indication.

In step 1310, a UE (such as the UE 116) is configured for PUR transmission by higher layers. In step 1320, the UE is provided by higher layer parameter pur-SS-window-duration a duration of a monitoring window. In step 1330, the UE transmits a NPUSCH transmission using preconfigured uplink resource ending in subframe n. In step 1340, the UE monitors the NPDCCH UE-specific search space in a search space window starting in subframe n+d, wherein d is given by one or by the sum of two or more of the following quantities: a first fixed timing offset, a second configured timing offset, a third value depending on the RTT wherein the third value is the sum of a Timing Advance (TA) and an additional $k_{MAC}$ value provided by higher layer.

Although FIG. 13 illustrates the method 1300 various changes may be made to FIG. 13. For example, while the method 1300 is shown as a series of steps, various steps could overlap, occur in parallel, occur in a different order, or occur multiple times. In another example, steps may be omitted or replaced by other steps. For example, steps of the method 1300 can be executed in a different order.

Embodiments of the present disclosure also describe determining a timing relationship of a DCI format zero to NPUSCH format 1.

In certain embodiments, a timing offset is associated to the transmission of a NPUSCH format 1 scheduled by a DCI format 0 in NTN. NPUSCH format 1 transmission can be scheduled by a NPDCCH with DCI format NO, or the transmission can correspond to using preconfigured uplink resource configured by higher layers. Transmission using preconfigured uplink resource is initiated by higher layers, while retransmission of transport blocks transmitted using preconfigured uplink resource are scheduled by a NPDCCH with DCI format NO.

A UE shall upon detection on a given serving cell of a NPDCCH with DCI format NO ending in NB-IoT DL subframe n scheduling NPUSCH intended for the UE, perform, at the end of either (i) $n+k_0+k\_offset$ DL subframe for frequency division duplex (FDD), or (ii) $k_0+k\_offset$ NB-IoT UL subframes following the end of n+8 subframe for time division duplex (TDD), a corresponding NPUSCH transmission using NPUSCH format 1 in N consecutive NB-IoT UL slots $n_i$ with i=0, 1, . . . , N−1 according to NPDCCH information. Here, the subframe n is the last subframe in which the NPDCCH is transmitted and is determined from the starting subframe of NPDCCH transmission and the DCI subframe repetition number field in the corresponding DCI. Additionally, N is defined in Equation (1), below:

$$N = N_{TB}N_{Rep}N_{RU}N_{slots}^{UL} \tag{1}$$

In Equation (1), the value of $N_{Rep}$ is determined by the repetition number field in the corresponding DCI. The value of $N_{RU}$ is determined by the resource assignment field in the corresponding DCI. The value of $N_{slots}^{UL}$ is the number of NB-IoT UL slots of the resource unit corresponding to the $N_{sc}^{RU}$ allocated number of subcarriers in the corresponding DCI. The value of $N_{TB}$ is determined by the Number of scheduled TB for Unicast field, if present, in the corresponding DCI, $N_{TB}=1$. Otherwise no is the first NB-IoT UL slot starting after the end of subframe $n+k_0$ for FDD or no is the first NB-IoT UL slot starting after $k_0$ NB-IoT UL subframes following the end of n+8 subframe for TDD.

Additionally, the value of $k_0$ is determined by the scheduling delay field ($I_{Delay}$) in the corresponding DCI for FDD, wherein the mapping is $I_{Delay}=\{0,1,2,3\}$ and $k_0=\{8,16,32,64\}$, and for TDD wherein the mapping is $I_{Delay}=\{0,1,2,3\}$ and $k_0=\{0,8,16,32\}$.

The value of k_offset is determined by the propagation delay field (I_offset) in the corresponding DCI according to a mapping as for example in the Table (1). The mapping can be different for the FDD and TDD case.

TABLE 1

| I_offset | k_offset |
| --- | --- |
| 0 | 32 |
| 1 | 64 |
| 2 | 128 |
| 3 | 256 |

Alternatively, a time relationships such as (i) n+k_t DL subframe for FDD or (ii) k_t NB-IoT UL subframes following the end of n+8 subframe for TDD can be used. Here, k_t is determined by a joint mapping of I_delay and I_offset.

For another example, the mapping between I_offset and k_offset is different from the Table (1) above, and the four values of I_offset are mapped to other values. For instance, the k_offset values are {256, 512, 1024, 2048}, or {1024, 2048, 4096, 8192}.

For yet another example, the mapping between I_offset and k_offset includes 8 values and I_offset field in the corresponding DCI is 3 bits. It is also possible that 16 values are used and the I_offset field in the corresponding DCI is 4 bits. When the mapping is extended and k_offset values can be more than 4, the value $k_0$ used in the timing relationship can be the maximum value (64 and 32 for FDD and TDD, respectively).

Other time relationships such as (i) $n+k_{NTN}$ DL subframe for FDD or (ii) $k_{NTN}$ NB-IoT UL subframes following the end of n+8 subframe for TDD, can be used. Here, the $k_{NTN}=k_0+k\_offset$. The mapping between I_offset and $k_{NTN}$ combines the values of $k_0$ and k_offset and the resulting mapping of I_offset and $k_{NTN}$ is a 1-to-1 mapping.

In certain embodiments, a gNB (such as the BS 102) can configure different mappings of I_offset and k_offset, and indicate to the UE the mapping by DCI signaling or by higher layer signaling.

A k_offset can be provided in a DCI format. Either I_offset or k_offset can be provided in SIB, or can be configured in a preconfigured time resources configuration, or can be configured in a time offset configuration.

Embodiments of the present disclosure also describe determining a timing relationship of a narrowband random access response grant to NPUSCH format 1.

In certain embodiments, in NTN a timing offset is associated to the transmission of a NPUSCH format 1 scheduled by Narrowband RAR Grant. The higher layers indicate the Narrowband RAR Grant to the physical layer, which includes 2 bits for the scheduling delay field ($I_{Delay}$) with $k_0=12$ for $I_{Delay}=0$, where NB-IoT DL subframe n is the last subframe in which the NPDSCH associated with the Narrowband RAR Grant is transmitted. An additional delay offset k_offset is added and the relationships described above for NPUSCH format 1 transmission scheduled by a NPDCCH with DCI format N0 are also valid when the scheduling of NPUSCH format 1 is done by a Narrowband RAR Grant.

Embodiments of the present disclosure also describe determining a timing relationship of a NPDSCH to HARQ-ACK on NPUSCH format 2.

In certain embodiments, in NTN a timing offset is associated to the transmission of a NPUSCH format 2 that indicates an HARQ-ACK information and is scheduled by an NPDSCH. The same logic for an additional delay offset k_offset used in the above timing relationships for transmission of NPUSCH format 1 applies also to the transmission of NPUSCH format 2. The timing relationships for NTN NB-IoT can be as follows.

For example, a UE shall upon detection of a NPDSCH transmission ending in NB-IoT subframe n intended for the UE and for which an ACK/NACK shall be provided, start, after the end of $n+k_0'-1+k\_offset$ of a DL subframes for FDD or $k_0'-1+k\_offset$ of a -IoT UL subframes following the end of n+12 subframe for TDD, transmission of the NPUSCH format 2 in N consecutive NB-IoT UL slots.

Embodiments of the present disclosure also describe determining a timing relationship of a preamble transmission initiated by a PDCCH order channel.

In certain embodiments, in NTN, a timing offset is associated to a NPRACH preamble transmission of a random access procedure initiated by a PDCCH order channel. For example, when a UE (such as the UE 116) receives a PDCCH order ending in subframe n, the UE shall, if requested by higher layers, start transmission of random access preamble at the end of the first subframe $n+k_2+k\_offset$, $k_2\geq8$, where a NPRACH resource is available. The timing relationship can also be expressed as $n+k_{2NTN}$, wherein the value of $k_{2NTN}$ is a function of k_offset which depends on the round trip delay and is determined by one of the methods described above in this disclosure.

Embodiments of the present disclosure also describe determining a timing relationship of a NPRACH preamble retransmission.

Here, a timing offset is associated to a retransmission of a PRACH preamble. In NTN, after a PRACH transmission, if a random access response is received and the corresponding DL-SCH transport block ending in subframe n does not contain a response to the transmitted preamble sequence, or if no NPDCCH scheduling random access response is received in subframe n, where subframe n is the last subframe of the random access response window, or if an NPDCCH scheduling random access response with associated RA-RNTI is detected and the corresponding DL-SCH transport block reception ending in subframe n cannot be successfully decoded, the UE shall, if requested by higher layers, be ready to transmit a new preamble sequence no later than the NB-IoT UL slot starting 12 milliseconds after the end of subframe n (subframe n is a DL frame).

Embodiments of the present disclosure also describe determining a subframe number of initialization of the scrambling sequence generator.

Here, for NTN the timing offset value can be several seconds and after a UE applies the timing adjustment by an additional delay k_offset, the subframe number where a NPUSCH transmission starts is changed to ns=n+k0+k_offset. The value ns that takes into account the additional offset k_offset is used to initialize the scrambling sequence generator. For codeword q the scrambling sequence generator shall be initialized as described in Equation (2).

$$c_{init} = n_{RNTI} \cdot 2^{14} + q \cdot 12^{13} + \lfloor n_s/2 \rfloor \cdot 2^9 + N_{ID}^{cell} \qquad (2)$$

At the start of each subframe where $n_{RNTI}$ corresponds to the RNTI associated with the PUSCH transmission and ns is the subframe where the PUSCH transmission starts, wherein the RNTI can be C-RNTI, PUR-RNTI, TC-RNTI, SPS C-RNTI, CS-RNTI, and the like.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive information, via a system information block, on a first time offset; and
a processor operably coupled to a transceiver, the processor configured to:
  identify that a random access procedure is initiated by a physical downlink control channel (PDCCH) order ending in a first subframe; and
  determine a second subframe based on the first subframe and the first time offset,
wherein the transceiver is further configured to:
  start transmission of a random access preamble at an end of the second subframe,
  receive information on a second time offset and information on a duration of a time window, and

initiate a narrowband physical uplink shared channel (NPUSCH) transmission using a preconfigured uplink resource ending in a third subframe,
wherein the processor is further configured to:
  determine a fourth subframe based on the third subframe, a fixed value, and the second time offset, and
  monitor a narrowband physical downlink control channel (NPDCCH) UE-specific search space in a search space window starting in the fourth subframe with the duration,
wherein the transceiver is further configured to receive information on a third time offset via a medium access control control element (MAC CE),
wherein the processor is further configured to determine a fourth time offset by using the first time offset and the third time offset,
wherein the transceiver is further configured to receive a first channel in a first time unit,
wherein the processor is further configured to determine a second time unit based on the first time unit and the fourth time offset, and
wherein the transceiver is further configured to transmit a second channel associated with the first channel at or after an end of the second time unit.

2. The UE of claim 1, wherein:
the processor is further configured to:
  identify that the UE is configured to report a time advance (TA) value estimated by the UE, and
  determine the TA value, and
the transceiver is further configured to transmit information on the TA value via a medium access control element (MAC CE).

3. The UE of claim 1, wherein:
the first channel is a narrowband physical downlink control channel (NPDCCH) that includes a downlink control information (DCI) format scheduling the transmission of the second channel, and
the second channel is a NPUSCH.

4. The UE of claim 1, wherein:
the first channel is a narrowband physical downlink shared channel (NPDSCH), and
the second channel is NPUSCH that includes acknowledgment information in response to the reception of the NPDSCH.

5. The UE of claim 1, wherein an index of the fourth subframe is n+4+k, n is an index of the third subframe, 4 is the fixed value, and k is the second time offset.

6. A base station (BS) comprising:
a transceiver configured to transmit information, via a system information block, on a first time offset; and
a processor operably coupled to a transceiver, the processor configured to:
  identify that a random access procedure is initiated by a physical downlink control channel (PDCCH) order ending in a first subframe; and
  determine a second subframe based on the first subframe and the first time offset,
wherein the transceiver is further configured to:
  start reception of a random access preamble at an end of the second subframe,
  transmit information on a second time offset and information on a duration of a time window, and
  receive a narrowband physical uplink shared channel (NPUSCH) using a preconfigured uplink resource ending in a third subframe, wherein the processor is further configured to:

determine a fourth subframe based on the third subframe, a fixed value, and the second time offset, and transmit in a narrowband physical downlink control channel (NPDCCH) UE-specific search space in a search space window starting in the fourth subframe with the duration, wherein the transceiver is further configured to transmit information on a third time offset via a medium access control control element (MAC CE), wherein the processor is further configured to determine a fourth time offset by using the first time offset and the third time offset, wherein the transceiver is further configured to transmit a first channel in a first time unit, wherein the processor is further configured to determine a second time unit based on the first time unit and the fourth time offset, and wherein the transceiver is further configured to receive a second channel associated with the first channel at or after an end of the second time unit.

7. The BS of claim 6, wherein:

the processor is further configured to identify that a user equipment (UE) is configured to report a time advance (TA) value estimated by the UE, and the transceiver is further configured to receive information on the TA value via a medium access control control element (MAC CE).

8. The BS of claim 6, wherein:

the first channel is a narrowband physical downlink control channel (NPDCCH) that includes a downlink control information (DCI) format scheduling the reception of the second channel, and the second channel is a NPUSCH.

9. The BS of claim 6, wherein:

the first channel is a narrowband physical downlink shared channel (NPDSCH), and the second channel is NPUSCH that includes acknowledgment information in response to the transmission of the NPDSCH.

10. The BS of claim 6, wherein an index of the fourth subframe is n+4+k, n is an index of the third subframe, 4 is the fixed value, and k is the second time offset.

11. A method performed by a user equipment (UE), the method comprising:

receiving information, via a system information block, indicating on a first time offset; identify that a random access procedure is initiated by a physical downlink control channel (PDCCH) order ending in a first subframe;

determining a second subframe based on the first subframe and the first time offset;

starting transmission of a random access preamble at an end of the second subframe;

receiving information on a second time offset and information on a duration of a time window;

initiating a narrowband physical uplink shared channel (NPUSCH) transmission using a preconfigured uplink resource ending in a third subframe;

determining a fourth subframe based on the third subframe, a fixed value, and the second time offset;

monitoring a narrowband physical downlink control channel (NPDCCH) UE-specific search space in a search space window starting in the fourth subframe with the duration;

receiving information on a third time offset via a medium access control control element (MAC CE);

determining a fourth time offset by using the first time offset and the third time offset;

receiving a first channel in a first time unit;

determining a second time unit based on the first time unit and the fourth time offset; and transmitting a second channel associated with the first channel at or after an end of the second time unit.

12. The method of claim 11, further comprising:

identifying that the UE is configured to report a time advance (TA) value estimated by the UE;

determining the TA value; and transmitting information on the TA value via a medium access control control element (MAC CE).

13. The method of claim 11, wherein:

the first channel is a narrowband physical downlink control channel (NPDCCH) that includes a downlink control information (DCI) format scheduling the transmission of the second channel, and the second channel is a NPUSCH.

14. The method of claim 11, wherein:

the first channel is a narrowband physical downlink shared channel (NPDSCH), and the second channel is NPUSCH that includes acknowledgment information in response to the reception of the NPDSCH.

15. The method of claim 11, wherein an index of the fourth subframe is n+4+k, n is an index of the third subframe, 4 is the fixed value, and k is the second time offset.

* * * * *